Jan. 4, 1955
C. O. BLAISDELL ET AL
2,698,643
APPARATUS FOR FORMING ARTICLES
Filed May 1, 1951
3 Sheets-Sheet 1
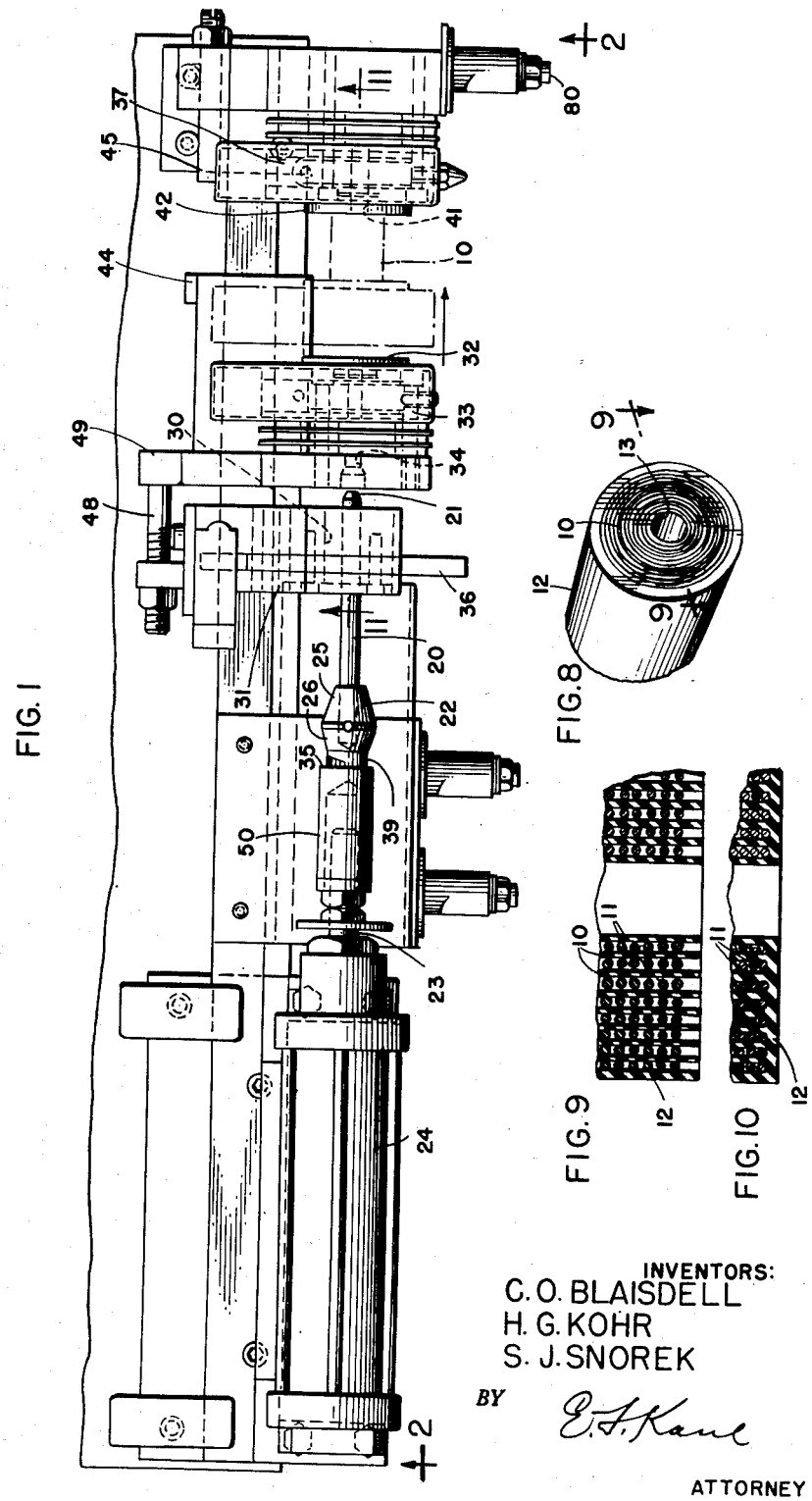
INVENTORS:
C. O. BLAISDELL
H. G. KOHR
S. J. SNOREK
BY
ATTORNEY Jan. 4, 1955 C. O. BLAISDELL ET AL 2,698,643
APPARATUS FOR FORMING ARTICLES
Filed May 1, 1951 3 Sheets-Sheet 2
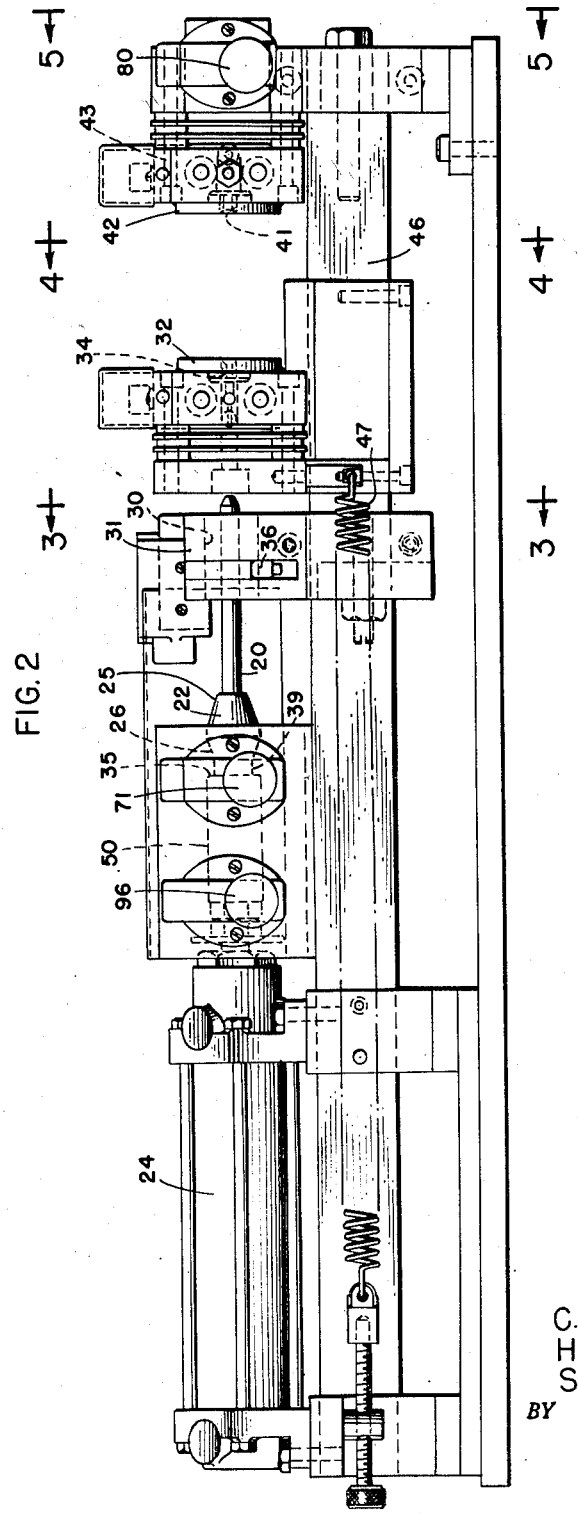
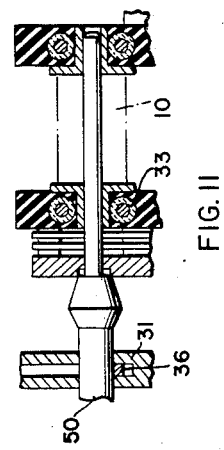
INVENTORS:
C. O. BLAISDELL
H. G. KOHR
S. J. SNOREK
BY
E. F. Kane
ATTORNEY

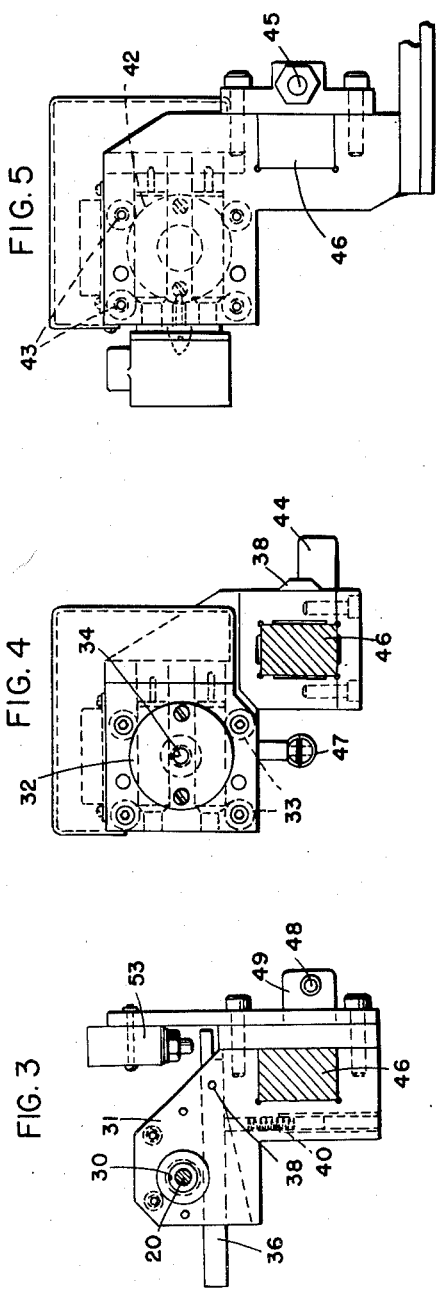
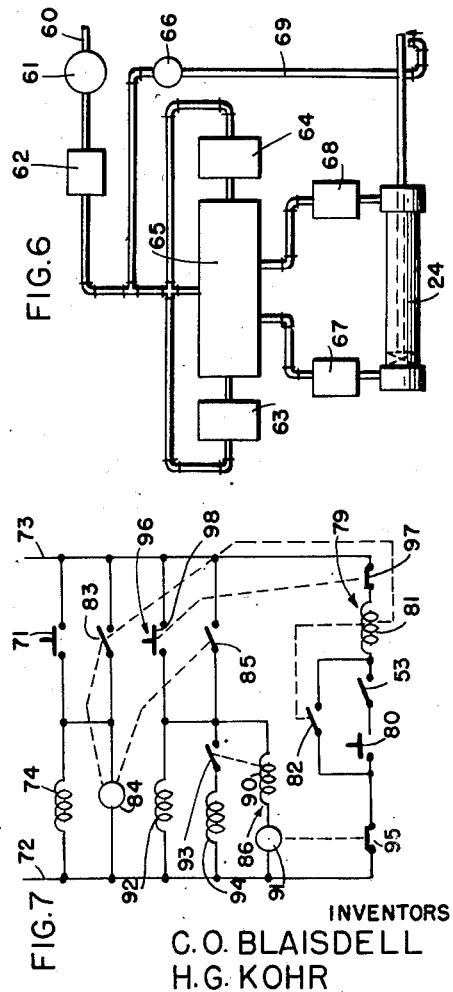
INVENTORS:
C. O. BLAISDELL
H. G. KOHR
S. J. SNOREK
BY
E. F. Kane
ATTORNEY

United States Patent Office 2,698,643
Patented Jan. 4, 1955

2,698,643
APPARATUS FOR FORMING ARTICLES

Charles O. Blaisdell, Indianapolis, Ind., and Hilton G. Kohr, Chicago, and Stanley J. Snorek, Berwyn, Ill., assignors to Western Electric Company, Incorporated, New York, N. Y., a corporation of New York Application May 1, 1951, Serial No. 223,964

7 Claims. (Cl. 154—1)

This invention relates to apparatus for forming articles, and more particularly to apparatus for coalescing the end portions of sheets of plastic material positioned between conductive windings of coils.

In the manufacture of coils of the type having sheets of plastic material positioned between adjacent layers of the coil windings, it has been customary to fuse or coalesce the end portions of the plastic sheets to prevent displacement of the windings in the coil. In the past, this has been accomplished by two opposed bosses having heated platens which are pressed toward one another with the bosses entering the central bore in the coil. However, great care had to be exercised to prevent the bosses from disturbing the portions of the coil adjacent to the bore therethrough, and it was difficult to maintain the bosses in alignment.

An object of the invention is to provide new and improved apparatus for forming articles.

A further object of the invention is to provide new and improved apparatus for coalescing the end portions of sheets of plastic material positioned between adjacent layers of the windings of coils.

A further object of the invention is to provide new and improved apparatus for coalescing opposite end portions of plastic separating sheets of coils and simultaneously maintain the central bores of such coils.

An apparatus illustrating certain features of the invention may include an arbor movable with one heated platen. A generally annular coil may be placed over the arbor, and the arbor and the platen may be moved toward a second heated platen to force the heated platens against opposite ends of the coil to coalesce plastic sheets interleaving the layers of the winding of the coil and extending beyond said windings. The arbor and the first platen then may be moved away from the second platen.

A complete understanding of the invention may be obtained from the following detailed description of an apparatus forming a specific embodiment thereof, when read in conjunction with the appended drawings, in which Fig. 1 is a fragmentary, top plan view of an apparatus forming one embodiment of the invention;

Fig. 2 is a front elevational view taken along line 2—2 of Fig. 1;

Fig. 3 is a fragmentary, vertical section taken along line 3—3 of Fig. 2;

Fig. 4 is a vertical section taken along line 4—4 of Fig. 2;

Fig. 5 is a side view of the apparatus taken along line 5—5 of Fig. 2;

Fig. 6 is a schematic diagram of a fluid pressure system associated with the apparatus shown in Fig. 1;

Fig. 7 is a schematic view of a control circuit associated with the apparatus shown in Fig. 1;

Fig. 8 is a perspective view of the coil to be processed by the apparatus shown in Fig. 1;

Fig. 9 is an enlarged, fragmentary, horizontal section taken along line 9—9 of Fig. 8;

Fig. 10 is an enlarged, fragmentary, horizontal section similar to that shown in Fig. 9 after the coil has been processed by the apparatus shown in Fig. 1, and Fig. 11 is a fragmentary vertical section taken along line 11—11 of Fig. 2.

Referring now in detail to the drawings, there is shown therein an apparatus for heating the end portions of sheets 10—10 composed of cellulose acetate or other fusible insulating material positioned between windings 11—11 of an annular coil 12 to fuse the end portions of the sheets 10—10 together to hold them against movement relative to one another to prevent displacement of the layers 11—11 of the coil winding, and distortion of the central bore 13 extending through the coil 12. This apparatus includes an arbor 20 having a tapered end portion 21 carried by a chuck 22 secured adjustably to a piston 23 mounted slidably in a cylinder 24. The chuck is provided with tapered portions 25 and 26. The piston 23 may be actuated to move the arbor 20 to the right to move it through a bore 30 formed in a guide 31 and a close-fitting bore 34 in the platen 32 heated by electrical heating elements 33—33 to a loading position, in which a shoulder 35 formed on the chuck 22 abuts a stop lever 36 mounted on the guide 31 by a pin 38 and pressed into a groove 39 in advance of the shoulder 35 by a compression spring 40. The coil 10 then may be slid over the portion of the arbor 20 projecting through the platen 32. On further movement of the arbor 20 to the right, as viewed in Fig. 1, from its loading position, the chuck 22 moves through the bore 30 in the guide 31 and moves the platen 32 toward the right until the arbor 20 enters a close-fitting bore 41 formed in a stationary platen 42 heated by electrical heating elements 43—43, and presses the coil tightly between the platens 32 and 42 until a lug 44 engages an adjustable stop screw 45 to size the coil. When air under pressure is introduced into the righthand end of the cylinder 24 and exhausted from the lefthand end thereof, the piston 23 is retracted, thereby returning the chuck 22 and the arbor 20 to the left. During the first portion of the movement of the chuck 22 to the left, the platen 32 is held against the chuck 22 and is moved along a fixed guide bar 46 to the left by a tension spring 47. This movement of the platen 32 continues until a lug 49 engages an adjustable stop screw 48 mounted on a lug of the guide 31. The bore 30 in the guide 31 has the same diameter as that of the largest portion of the tapered portions 25 and 26 of the chuck and a shank 50 of the chuck. Hence, the guide 31 supports the chuck as the chuck is slid therethrough. When the operator presses the lefthand end of the lever 36 downwardly, as viewed in Fig. 3, the lever 36 is moved out of the path of the shoulder 35 to permit further movement of the chuck 22 to the right, as viewed in Fig. 1, and the righthand end of the lever 36, as viewed in Fig. 3, actuates a switch 53.

A pipeline 60 (Fig. 6) leads from a source of air under pressure to a manually operable valve 61, a flow control unit 62, two three-way valves 63 and 64, a four-way, three position, pilot operated valve 65 and a solenoid operated two-way valve 66. The valves 63, 64 and 65 are designed to alternately connect the high pressure line 60 to speed control valves 67 and 68 which are connected to the lefthand end of the cylinder 24 and the righthand end thereof, respectively, as viewed in Fig. 6. A pipeline 69 leading from the valve 66 is directed toward the arbor 21 when the arbor is in its retracted position to cool the arbor, so that the arbor will not soften insulating material in the inner portion of the coil 12 when the coil 12 is placed thereover.

A control circuit of the apparatus includes a manually operable, momentary starting switch 71 (Fig. 7) connected across conductors 72 and 73 of a powerline in series with a solenoid winding 74 and a timer motor 84 connected in parallel with the winding 74. When the winding 74 is energized, it actuates the valve 63 to move the valve 65 to a condition supplying air under pressure to the lefthand end of the cylinder 24 and exhausting the other end thereof to move the arbor 20 to a loading position and the chuck 22 against the lever 36. The operator then may load a coil on the arbor, depress the lever 36 with one hand to close the switch 53 and actuate a manually operable momentary switch 80 with the other hand. This energizes a timer clutch winding 81 of a timer 79, which immediately closes a holding contact 82 and a contact 83. Closure of the contact 83 energizes the motor 84 of the timer and the winding 74 to move the valve 65 (Fig. 6) to a condition actuating the cylinder to move the arbor to its coil-coalescing position.

After the timer motor 84 has run a predetermined period of time, it opens the contact 83 to deenergize the winding 74, and closes a contact 85 to start a second timer 86. The timer motor 84 also is deenergized, but as long as the clutch winding 81 remains energized, the timer 79 does not reset. Closing of contact 85 energizes a timer clutch winding 90 and a timer motor 91, and energizes a solenoid winding 92 to actuate the valve 64 to reverse the valve 65 to retract the arbor to its starting position. The energization of the clutch winding 90 closes a contact 93 to energize a solenoid winding 94, which opens the valve 66 so that the pipeline 69 directs air onto the arbor 20 to cool it.

After the motor 91 has run a predetermined period of time, which is the time necessary to cool the arbor sufficiently, the motor 91 opens a contact 95 to reset the timer 79. Resetting of the motor 84 of the timer 79 opens the contact 85, which deenergizes the timer 86. A manually operable, momentary switch 96 having a normally closed contact 97 in series with the clutch winding 81, and a normally open contact 98 in series with the reversing winding 92 may be used to cause movement of the arbor 20 to the left at any point in the travel of the arbor.

*Operation*

The switch 71 is actuated manually to actuate the solenoid-operated valve 63. This actuates the valve 65 to a condition supplying air to the lefthand end of the cylinder 24, as viewed in Fig. 6, and exhausting air from the righthand portion thereof. The cylinder 24 through the piston 23 moves the chuck 22 and the arbor 20 to the right as viewed in Fig. 2, until the shoulder 35 on the chuck 22 engages the lever 36, the tapered portion 26 permitting the lever to be pressed gently into the groove 39. In this position, the arbor 20 projects through and beyond the movable platen 32. A coil then is placed manually on the arbor, the lever 36 is moved manually out of the path of the chuck 22, which movement closes the switch 53, the switch 80 is manually actuated simultaneously therewith, and the movement of the arbor 20 is resumed. The forward end of the chuck 22 engages the platen 32 and pushes it to the right with the arbor 20. The tapered end of the arbor 20 enters the bore 41 in the platen 42, and the platens compress the end portions of the plastic sheets 10—10 and coalesce them together until the lug 44 (Fig. 1) engages the stop screw 45. Thus, coalescing and sizing both occur. During the pressing action, the guide 31 supports the chuck 22, and the arbor 20 fits tightly in the bores in the platens to keep melted plastic material from entering the bores.

The timer 79 (Fig. 7) times out to actuate the valve 64 to supply air under pressure to the righthand end of the cylinder 24 and exhaust it from the lefthand end, and the pipeline 69 blows air on the arbor. This causes the arbor 20 and the chuck 22 to be retracted to their lefthand positions, the coil 10 being stripped from the arbor 20 as the arbor 20 is slid out of the bore 13 in the coil. As the chuck 22 is moved out of engagement with the lever 36, the spring 40 (Fig. 3) presses the lever in a clockwise direction to move it out of actuating engagement with the switch 53. After the blast of air from the pipeline 69 has removed heat from the arbor previously accumulated from the heating elements 31 and 37, the timer 86 times out and the control circuit resets to zero. The operation described hereinabove then may be repeated with another coil.

The apparatus described hereinabove coalesces the end portions of the sheets 10—10 without heating or damaging the innermost plastic sheet forming the bore 13 in the coil 12 so that irregularities of this bore are not caused and sticking of the coil 12 to the arbor is prevented. The apparatus forms the ends of the coil perpendicular to the longitudinal axis thereof, and sizes the coils as to length.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for coalescing the end portions of plastic sheets of insulating material of coils, which comprises a fixed platen having a bore therein, means for heating the platen, a movable platen having a bore therethrough, means heating the movable platen, means urging the movable platen away from the fixed platen, an arbor fitting closely but slidably in the bores, means for moving the arbor through the bore in the movable platen from a starting position to a loading position, and means for pressing the movable platen and the arbor toward the fixed platen to apply pressure to a coil positioned on the arbor between the platens.

2. An apparatus for coalescing the ends of coils, which comprises a fixed, heated platen having a bore therein, a movable, heated platen having a bore therethrough, means urging the movable platen away from the fixed platen, an arbor fitting closely but slidably in the bores, and means for moving sequentially the arbor from a retracted position not extending through the bore in the movable platen to an intermediate loading position projecting through that bore, and means for pressing the movable platen and the arbor from the intermediate position projecting into the bore in the fixed platen toward the fixed platen to apply pressure to the coil positioned on the arbor between the platens.

3. An apparatus for coalescing plastic insulating sheets of coils, which comprises a base, a heated platen having a bore located centrally therein fixed to the base, a movable platen having a bore extending therethrough, means mounting the movable platen slidably on the base in a position facing the fixed platen, means urging the movable platen away from the fixed platen, an arbor designed to be moved through the bore in the movable platen and to enter the bore in the fixed platen and fittable closely but slidably in said bores, means for moving the arbor through the bore in the movable platen and into the bore in the fixed platen, an air blower for blowing air on the arbor to cool it, means for stopping the movement of the arbor toward the fixed platen in a position in which the arbor projects through the movable platen only sufficiently for a coil having a bore therethrough to be placed on the portion of the arbor between the platens, means for stopping the air blower and for releasing the stopping means, and means for moving the movable platen toward the fixed platen as the arbor is moved toward the fixed platen to press the coil mounted on the arbor between the platens.

4. An apparatus for coalescing plastic insulating sheets of coils, which comprises a base, a heated platen fixed to the base, a movable platen having a bore extending therethrough, means mounting the movable platen slidably on the base in a position facing the fixed platen, an arbor fitting tightly in the bore in the movable platen and designed to be moved through the bore in the movable platen toward the fixed platen, means for moving the arbor through the bore in the movable platen and toward the fixed platen, means for moving the movable platen toward the fixed platen, means for stopping the movement of the arbor toward the fixed platen in a position relative to the movable platen in which the arbor projects through the movable platen only sufficiently for a coil having a bore therethrough to be placed on the arbor between the platens, and means for moving the movable platen toward the fixed platen as the arbor is moved toward the fixed platen to press the coil mounted on the arbor between the two platens.

5. An apparatus for coalescing portions of plastic sheets extending beyond windings of coils, which comprises a guide bar, a heated platen fixed in a position at one end of the guide bar, a second heated platen mounted slidably on the guide bar in a position facing the fixed platen, the movable platen being provided with a bore therethrough, the fixed platen having a bore therein aligned with the bore in the movable platen, means for urging the movable platen away from the fixed platen, an arbor designed to fit closely in the bores in the platens a chuck mounted on the piston and carrying the arbor in alignment with the bores in the platens, a cylinder associated with the piston, means for actuating the piston to move the arbor from a retracted position in which the arbor is withdrawn completely from the movable platen on the side thereof opposite to the fixed platen toward a position in which the arbor projects through the bore in the movable platen and into the bore in the fixed platen, and means for interrupting the travel of the arbor at a point therein in which the arbor projects through the movable platen sufficiently to hold a coil placed thereon and in which the end of the arbor is spaced sufficiently from the fixed platen to permit placing the coil on the arbor, means for releasing the interrupting means, and means for moving the movable platen with the chuck after the interrupting means is released.

6. An apparatus for coalescing portions of plastic sheets extending beyond windings of coils, which comprises a horizontal guide bar, a heated platen fixed to the guide bar at one end thereof in a vertical position, a second heated platen mounted slidably on the guide bar in a position facing the fixed platen, the movable platen being provided with a horizontal bore therethrough, the fixed platen having a horizontal bore therein aligned with the bore in the movable platen, a stop fixed with respect to the guide bar, means for urging the movable platen along the guide bar away from the fixed platen into engagement with the stop, a chuck, a piston carrying the chuck in alignment with the bores in the movable platens, a cylinder associated with the piston, an arbor designed to fit closely in the bores in the platens and carried by the chuck in alignment with the bores in the platens, means for actuating the piston to move the arbor from a retracted position in which the arbor is withdrawn completely from the movable platen on the side thereof opposite to the fixed platen to a position in which the arbor projects through the bore in the movable platen and into the bore in the fixed platen, means for interrupting the travel of the arbor in a loading position in which the arbor projects through the movable platen sufficiently to hold thereon a coil placed thereon and in which the end of the arbor is spaced sufficiently from the fixed platen to permit the placing of the coil on the arbor, means for releasing the interrupting means, said chuck being designed to engage the movable platen to move it with the arbor toward the fixed platen to press the coil therebetween, whereby the end portions of sheets of plastic material projecting beyond the winding of the coil are melted together, and means for limiting the movement of the movable platen toward the fixed platen.

7. An apparatus for coalescing the ends of coils, which comprises a guide bar, a heated platen having a bore of a predetermined diameter fixed at one end of the guide bar, an arbor extending along the guide bar in alignment with the bore and designed to fit closely but slidably therein, a second heated platen having a bore therein aligned with and having the same diameter as that of the bore in the first platen and mounted slidably on the guide bar with the bore therein aligned with the bore in the first platen, means urging the second platen away from the first platen, and means for sequentially moving the arbor through the bore in the second platen to a loading position, and means for moving the arbor and the second platen from the loading position toward the first platen to press a coil between the platens.

References Cited in the file of this patent

UNITED STATES PATENTS

| | | |
|---|---|---|
| 473,343 | Rasner | Apr. 19, 1892 |
| 1,326,366 | Milton | Dec. 30, 1919 |
| 1,864,331 | Whitesmith | June 21, 1932 |
| 2,255,116 | Helmstaedter | Sept. 9, 1941 |
| 2,305,010 | Kenney et al. | Dec. 15, 1942 |
| 2,369,362 | Marziani | Feb. 13, 1945 |
| 2,452,999 | Daly | Nov. 2, 1948 |
| 2,521,388 | Maynard | Sept. 5, 1950 |
| 2,526,888 | Marik | Oct. 24, 1950 |
| 2,531,402 | Cooper et al. | Nov. 28, 1950 |